United States Patent [19]

Lawhon, Jr. et al.

[11] Patent Number: 4,474,595
[45] Date of Patent: Oct. 2, 1984

[54] FERTILIZER PRODUCT AND PROCESS FOR MAKING AND USING IT

[75] Inventors: William T. Lawhon, Jr., Lexington, Ky.; Henry M. Grotta, Delaware, Ohio

[73] Assignee: International Spike, Inc., Lexington, Ky.

[21] Appl. No.: 472,052

[22] Filed: Mar. 10, 1983

[51] Int. Cl.³ .............................................. C05C 9/02
[52] U.S. Cl. ..................................... 71/28; 71/64.01; 71/64.11; 71/64.13
[58] Field of Search ..................... 71/1, 11, 27, 28–30, 71/64.01, 64.11, 64.13, 903

[56] References Cited

U.S. PATENT DOCUMENTS

| | | |
|---|---|---|
| 2,091,993 | 9/1937 | Jones . |
| 2,502,996 | 4/1950 | Rohner . |
| 2,618,546 | 11/1952 | Davenport . |
| 3,119,683 | 1/1964 | Kealy et al. . |
| 3,264,088 | 8/1966 | Hansen . |
| 3,502,458 | 3/1970 | Schenk . |
| 3,647,416 | 3/1972 | Messman . |
| 3,748,115 | 7/1973 | Sommer et al. . |
| 3,892,552 | 7/1975 | Gay, Jr. . |
| 3,914,900 | 10/1975 | Bigelow et al. . |
| 3,970,625 | 7/1976 | Moore et al. . |
| 3,977,992 | 8/1976 | Hofacker . |
| 4,002,458 | 1/1977 | Hofacker . |
| 4,014,675 | 3/1977 | Osburn . |
| 4,052,190 | 10/1977 | Berliner . |
| 4,055,974 | 11/1977 | Jackson, Jr. . |
| 4,058,124 | 11/1977 | Yen et al. . |
| 4,063,919 | 12/1977 | Grano, Jr. . |
| 4,126,438 | 11/1978 | Pulli et al. . |
| 4,164,388 | 8/1979 | Inman et al. . |
| 4,171,337 | 10/1979 | Rosen et al. . |

FOREIGN PATENT DOCUMENTS

| | | |
|---|---|---|
| 970567 | 7/1975 | Canada . |
| 1139134 | 11/1962 | Fed. Rep. of Germany . |
| 1139133 | 12/1979 | Fed. Rep. of Germany . |
| 1406027 | 9/1975 | United Kingdom . |

OTHER PUBLICATIONS

Hayes, "Fertilizers for Controlled Release of Nitrogen".

Primary Examiner—Ferris H. Lander
Attorney, Agent, or Firm—Willian, Brinks, Olds, Hofer, Gilson & Lione, Ltd.

[57] ABSTRACT

A process for making controlled release fertilizer product containing an increased amount of sustained-release nitrogen includes the step of mixing a partly water soluble thermoplastic binder, and urea-formaldehyde condensate and a pH modifier. The amount of pH modifier should be sufficient to bring the pH of the shaped fertilizer product to the range from about 6 to about 12. The mixture is subjected to such conditions including temperature and pressure so as to produce a shaped fertilizer product. The resulting shaped fertilizer product includes approximately the same amount of sustained-release nitrogen as the urea-formaldehyde condensate in the mixture.

25 Claims, 2 Drawing Figures

U.S. Patent  Oct. 2, 1984  4,474,595
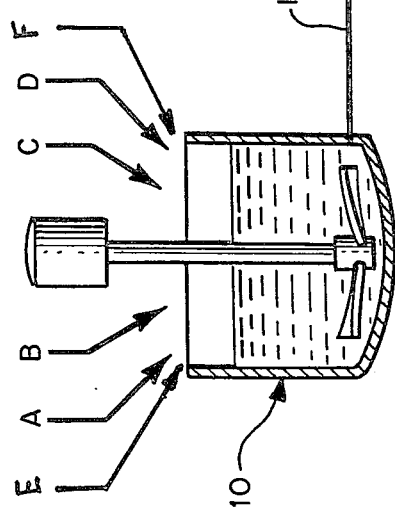
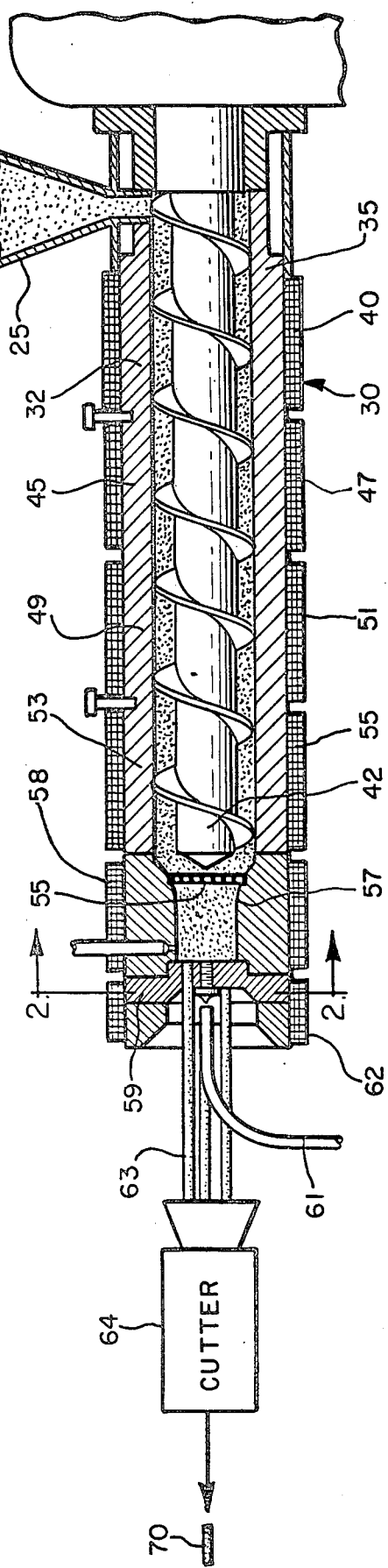
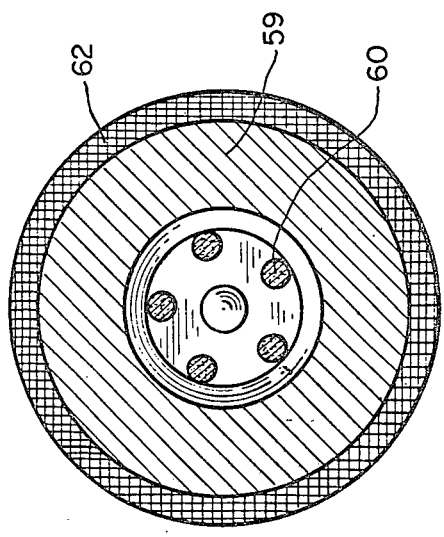

FERTILIZER PRODUCT AND PROCESS FOR MAKING AND USING IT

BACKGROUND OF THE INVENTION

This invention relates to controlled-release fertilizers. In particular, it relates to controlled-release fertilizers that contain urea-formaldehyde and supply, inter alia, nitrogen to plants.

It is advantageous to supply to plants the necessary nutrients, such as nitrogen, phosphorous and potassium at a controlled rate commensurate with the utilization of the nutrients by the plant. In order to fulfill this objective a number of controlled-release fertilizer delivery systems have been developed.

One system for controlled-release fertilizers utilizes urea-formaldehyde to bind the fertilizer material, thus retarding release of plant fertilizer materials into the soil. Such a system is described for example in U.S. Pat. No. 4,348,218 (Bond). In this system urea-formaldehyde acts merely as a binder and does not substantially supply nitrogen to the plant. The nitrogen sources in this composition are usually ammonium salts or inorganic nitrates. The urea-formaldehyde resin used in this system has a urea to formaldehyde molar ratio of about 0.5 to 1. An example of such urea-formaldehyde is RESIMINE UF 71 sold by Monsanto Company.

U.S. Pat. No. 4,063,919 (Grano, Jr.) discloses a fertilizer rod made of poly(vinyl alcohol), a plasticizer and a fertilizer (plant nutrient) which includes partly water-soluble urea formaldehyde.

U.S. Pat. No. 4,014,675 (Osburn) discloses a fertilizer stick composed of a hydroxy propyl cellouse thermoplastic material containing 10–80 weight percent of fertilizer material, such as ureaform. See Column 1, lines 59–63. The fertilizer can also include potash. Column 3, line 17.

The shaped fertilizer products for controlled release of fertilizers using poly(vinyl alcohol) as a binder and partly water-soluble urea-formaldehyde as the source of fertilizer nitrogen have been commercially sold in the United States for years. One such product is made as follows:

(a) about 44 weight percent of poly(vinyl alcohol);
(b) about 13–30 weight percent of urea-formaldehyde condensate having a mole ratio of urea to formaldehyde of about 1.25 to 1.4, such as BFC'S NITROFORM;
(c) about 25 to 42 weight percent of a mixture of inorganic materials supplying phosphorous and potassium; and
(d) about 1 weight percent of an inert plasticizer such as CARBOWAX 400 manufactured by Union Carbide Corporation.

The above ingredients are mixed together in a fluidizing mixer and the resulting mixture is fed into a heated extruder having the following temperature distribution:

| Zone One   | 220–240° F. |
|------------|-------------|
| Zone Two   | 240–260° F. |
| Zone Three | 260–280° F. |
| Zone Four  | 280–310° F. |
| Gate       | 310–340° F. |
| Die        | 340–380° F. |

Only a small portion of the nitrogen contained in the resulting fertilizer product is available for sustained-release during the growing period of a plant (a several month period). The amount of available sustained-release nitrogen was measured by standard method of analysis—Method 2.079 described in Methods of Analysis of the Association of Official Analytical Chemists (13th ed. 1980) (hereinafter AOAC), except that nitrogen quantity was determined in the hot water extract rather than in residue. The tests described on the products made in accordance with the procedures described above show that only about 5 weight percent of the total nitrogen is available for sustained release during the growing period of a plant.

Since the amount of sustained-release nitrogen in the urea-formaldehyde prior to making the fertilizer products was about 30 weight percent, some of the sustained-release nitrogen becomes unavailable during processing. Accordingly, the activity index (hereinafter AI) (which is another indication of the sustained release characteristic of nitrogen in urea-formaldehyde fertilizer products) is severely reduced during processing. The definition of the activity index is described in Method 2.079 of AOAC.

Similarly, in the processes disclosed in the Grano, Jr. and Osburn patents the AI of the urea-formaldehyde condensate is significantly reduced during the manufacturing of the fertilizer products. Therefore, significantly less of the controlled release fraction of the urea formaldehyde condensate is available for plant nutrition. The amount of the controlled release fraction is of such enormous importance to effective utilization of the fertilizer products that laws have been promulgated to prevent sales of product having controlled function below a certain minimum level as measured by the Activity Index. The manufacturing of shaped products in accordance with prior art methods reduces AI of the urea formaldehyde condensate below the level acceptable in at least some European countries. Accordingly, it is not possible to sell fertilizer products utilizing urea formaldehyde condensate as a nitrogen source in combination with other plant nutrients in these countries. Even in countries which do not have requirements for the minimum activity index of fertilizer products, the loss of the slow release fraction as measured by the AI results in inferior product performance.

The problem of unavailability of nitrogen has been recognized by the art. For example, in U.S. Pat. No. 4,052,190 (Berliner), the patentee states that urea-formaldehyde is an expensive form of nitrogen in part because considerable amounts thereof are fixed and, therefore, never become available for plant growth. See Column 1, lines 19–28 of the Berliner patent.

Despite its high cost, it is desirable to use urea-formaldehyde condensate as the source of nitrogen for several reasons. First, the utilization efficiency of nitrogen by plants is much higher than those provided by other nitrogen sources. Second, it is impossible to overdose and hence "burn" a plant by using urea-formaldehyde condensate but not when using other types of nitrogen sources. Third, fewer salts are introduced into the soil around the plant when using urea-formaldehyde condensate. Fourth, urea-formaldehyde condensate includes three fractions of nitrogen, the first of which becomes available in a matter of days, the second in a matter of months and the third in a matter of years. Thus, sustained release is built into the product.

There is, therefore, a need for a complete fertilizer product containing a urea-formaldehyde condensate as a source of nitrogen which contains amounts of sustained-release nitrogen that approximate those in urea-formaldehyde condensate feed stock and a process for making such fertilizer products.

Thus, one object of the present invention is to provide a fertilizer product that contains a proportionally increased amount of sustained-release nitrogen when compared with prior art products made from the same ingredients.

Another object of the present invention is to provide a process for making a urea-formaldehyde containing fertilizer product that does not significantly diminish the amounts of sustained-release nitrogen available in the urea-formaldehyde condensate.

A further object of the present invention is to maintain the activity index (AI) of the urea-formaldehyde condensate in the fertilizer product at the level approximating that of the urea-formaldehyde condensate feedstock.

Still another object of the present invention is to provide a process that does not significantly diminish the urea-formaldehyde activity index (AI) during processing into a fertilizer product.

Other objects of the present invention will become apparent to those skilled in the art upon studying this specification.

BRIEF DESCRIPTION OF THE INVENTION

The present invention provides a process for manufacturing controlled-release fertilizer products which does not significantly diminish the amount of sustained-release nitrogen in the urea-formaldehyde condensate. The present invention also provides fertilizer products and a method for using such products.

The process of the present invention includes a step of mixing a plant nutrient which includes a urea-formaldehyde condensate, a water soluble thermoplastic binder, a pH modifier, and a plasticizer to form a mixture. The mixture is then subjected to such conditions, including temperature and pressure so as to form a shaped product. The amount of the pH modifier in the mixture should be sufficient to bring the pH of the shaped product to the range from about 6 to about 12.

The resulting product includes approximately the same amount of sustained-release nitrogen as the original urea-formaldehyde condensate feed stock. Thus, the process of the present invention does not materially diminish the amount of sustained-release nitrogen in the final shaped product as was the case with prior art processes.

BRIEF DESCRIPTION OF THE DRAWINGS

FIG. 1 depicts a flow diagram of a preferred embodiment of the process of the present invention.

FIG. 2 is a cross-sectional view of the extruder shown in FIG. 1 taken along line 2—2 thereof.

DETAILED DESCRIPTION OF THE INVENTION

The present invention is based on a surprising and entirely unexpected discovery that when a pH modifier is included in the manufacturing of a urea formaldehyde condensate based fertilizer product, the amount of sustained-release nitrogen in the product is not diminished during manufacturing as is the case in prior art processes. The process produces a novel fertilizer product having a higher amount of sustained-release nitrogen than the prior art fertilizer products that contain urea-formaldehyde as the source of such nitrogen.

Any compound which increases the pH of the final shaped product to the range from about 6 to about 12 can be used as a pH modifier in the process of the present invention. Of course, such compound should be compatible with the other ingredients and should not harm either the plant or the soil. Generally, suitable pH modifiers are compounds which have the capacity to significantly increase the pH. Among the preferred compounds useful as pH modifiers are hydroxides. Especially preferred are hydrated lime and magnesium oxide.

The amount of the pH modifier added to the mixture of the present invention depends on the type of compound used as the pH modifier, the other ingredients of the mixture and processing conditions. Generally the amount should be sufficient to avoid any significant reduction in the amount of sustained-release nitrogen during processing of the mixture into a shaped product. It has been discovered that when a sufficient amount of the pH modifier is used to raise the pH of the shaped production to the range from about 6 to about 12, the activity index, which is a measure of sustained-release nitrogen is not diminished when compared to the activity index of the urea formaldehyde condensate used in the mixture. Preferably, a sufficient amount of the pH modifier is added to bring the pH of the shaped product to the range from about 6.5 to about 8.5. Generally, the desired pH can be achieved by using from about 2 to about 10 weight percent pH modifier in the mixture from which the shaped product is made.

The process for making shaped products in accordance with the present invention includes the following steps. First, a partly water soluble urea formaldehyde condensate, a water-soluble or at least partially water-soluble thermoplastic binder and a pH modifier are mixed to form a mixture. The mixture is then subjected to such conditions including temperature and pressure so as to shape it into shaped products. The shaping can be done by any of the conventional processes including molding, extruding, compression molding and the like. At the present time, extruding is the preferred manner of forming shaped products of the present invention. Generally, the extrusion is conducted at temperatures in excess of about 150° F.

Generally, the partly soluble urea-formaldehyde condenstate has a urea to formaldehyde ratio in the ranges from about 1.25 to about 1.4.

Examples of water soluble thermoplastic binders include poly(vinyl alcohol) and hydroxypropyl cellulose.

Additional ingredients which can be used in the mixture to facilitate processing and produce a shaped product having outstanding performance characteristics include: plant nutrients, plasticizers and fillers. Examples of plant nutrients which can be used include the primary, secondary and micro nutrients. Examples of plasticizers which can be used include the following: carbowax, water and glycerine. Examples of fillers include sand and clay.

DESCRIPTION OF THE PREFERRED EMBODIMENT OF THE INVENTION

The preferred ingredients and amounts thereof used for making fertilizer products of the present invention are as follows:

| Ingredient | Weight Percent of the Total |
| --- | --- |
| Urea-formaldehyde condensate | 12-45 |
| Water soluble thermoplastic binder | 25-45 |
| Phosphorous and potassium salts | 20-25 |
| Plasticizer | 0-5 |
| Hydrated Lime | 2-10 |
| Filler | 0-15 |

The preferred urea-formaldehyde condensate has a urea to formaldehyde mole ratio in the range from about 1.25 to about 1.4. Especially preferred is urea-formaldehyde condensate known as NITROFORM manufactured by BFC Corporation.

The preferred binder is poly(vinyl alcohol). Especially preferred is GELVATOL 205S manufactured by Monsanto Co., Inc. The preferred phosphorous salt used is triple super phosphate and the preferred potassium salt used is $K_2SO_4$. The preferred plasticizer is poly(ethylene glycol) having approximate average molecular weight of 400, such as CARBOWAX 400 manufactured by Union Carbide Corporation. The preferred pH modifier is hydrated lime and the preferred filler is clay.

The preferred process of the present invention will now be described in connection with the drawings. Referring now to FIG. 1, 25-45 pounds of poly(vinyl alcohol) (A), 12-45 pounds of NITROFORM (B), 20-25 pounds of a mixture of triple super phosphate and $K_2SO_4$ (C), 0-5 pounds of CARBOWAX 400 (D), 2-10 pounds of hydrated lime (E), and 0-15 pounds of filler (F) are fed into a Henschel Fluidizing Mixer 10 manufactured by H.P.M. Corporation, 820 Marion Road, Mt. Gilead, Ohio. The powdery heterogenous, mixture in particle size, is mixed until a uniform blend is achieved. Generally the mixing time is from about 35 to about 45 seconds.

The blend is passed via a line 15 to a holding container (surge tank) 20 and from there it is transferred to a hopper 25 of an extruder 30. The extruder 30 is a 2½ inch diameter, 69-inch long, single screw extruder manufactured by NRM Company of Akron Ohio. The extruder 30 has six independently controlled temperature zones. The blend is continuously fed from the hopper 25 into the zone one 30 of the barrel 35. The Zone One 32 is heated by an external electrical heating jacket 40 to a temperature of about 150° F.-220° F. The screw 42 powered by a conventional motor (not shown) slowly transports the blend from Zone One 32 to Zone Two 45. An electrical external jacket 47 maintains Zone Two of the extruder at about 160° F.-230° F. From Zone Two 45, the screw 42 moves the blend to Zone Three 49 which is maintained at a temperature of about 180° F.-240° F. by an external electrical jacket 51. The blend is then transported by the screw 42 to Zone Four 53 which is maintained at a temperature of about 190° F.-260° F. by an external electrical jacket 55.

The blend is forced from Zone Four 53 through a perforated plate 55 into a flared gate 57 maintained by an external electrical jacekt 58 at a temperature of about 250° F.-300° F. through the die plate 59. The die plate 59 includes a plurality of orifices 60 and is of the type disclosed in U.S. Pat. No. 4,164,388 issued on Aug. 14, 1979 and preferably includes an air ring 61 disclosed therein. The die 59 is maintained at about 280° F.-340° F. by an external electrical resistor jacket 62.

The die 59 forms the blend into continuous, generally cylindrical strands having a diameter of about 0.2 inches of product, which are then transported into a conventional cutter which cuts the strands to a desired length of about two inches to produce individual spikes 70. Generally 2 to 5 strands are simultaneously produced by the extruder 35.

The presently preferred cutter 63 is a fly wheel cutter manufactured by Teledyne Farris, Palisades Park, N.J.

The invention will now be further explained by the following examples which are not intended to limit the scope of the inventions but which are provided for illustrative purposes.

EXAMPLES

EXAMPLE I

Prior Art Composition and Process 44.5 pounds of poly(vinyl alcohol), GELVATOL, 30 pounds of NITROFORM, 25 pounds of 0-24-24 blend of triple super phosphate and $K_2SO_4$ and 0.5 pounds of CARBOWAX 400 were mixed for about one minute in a Henschel Fluidizing Mixer 10.

The blend was transferred to a surge tank 20 and from there fed into a hopper 25 of a single screw extruder 35 described in detail above. The separate sections of the extruder 35 were maintained at the following temperatures:

| | |
| --- | --- |
| Zone One | 220-240° F. |
| Zone Two | 240-260° F. |
| Zone Three | 260-280° F. |
| Zone Four | 280-320° F. |
| Gate | 320-340° F. |
| Die | 340-380° F. |

The blend was pushed through 5 openings in the die to produce five continuous strands which were then cut into individual spikes.

Spikes from six randomly selected packages were then analyzed The following results were obtained:

| Sample No. | Wt. % CWSN* | Wt. % HWSN | Activity Index |
| --- | --- | --- | --- |
| 1 | 25.8 | 5.8 | 7.8 |
| 2 | 37.8 | 3.9 | 6.3 |
| 3 | 36.2 | 4.7 | 7.4 |
| 4 | 32.1 | 4.4 | 6.5 |
| 5 | 33.3 | 5.9 | 8.9 |
| 6 | 32.1 | 5.1 | 7.5 |
| Average- | 32.8 | 5.0 | 7.4 |

*Weight percent of the nitrogen that is cold water soluble determined by Method 2.072 of AOAC.
**Weight percent of the nitrogen, that is hot water soluble (i.e., sustained release fraction) determined by Method 2.079 of AOAC.

NITROFORM used in this Example was purchased from BFC Corporation of Wilmington, Del. The technical specification specified that the NITROFORM included 38 weight percent of total nitrogen. The nitrogen included:

(a) 32.6 weight percent of cold water soluble nitrogen;

(b) 32.9 weight percent of hot water soluble nitrogen;

(c) 34.5 weight percent of residual nitrogen.

The Activity Index was guaranteed to be at least 40.

Based on the above data, the following conclusions were drawn:

(1) The percent of nitrogen which is cold water soluble remained substantially unchanged during processing;

(2) The percent of nitrogen which is hot water soluble was markedly reduced, from about 33 weight percent to about 5 weight percent;

(3) The activity index was also drastically reduced, from about 40 to about 7.4. Thus, the amount of sustained-release nitrogen in the product is substantially less than that in the NITROFORM feed stock, indicating that the process results in the conversion of the sustained-release nitrogen to residual nitrogen.

EXAMPLE II

Present Invention

The procedure of Example I was followed except the amounts of ingredients used were as follows:

| NITROFORM | 30 pounds |
|---|---|
| GELVATOL | 39.5 pounds |
| 0-24-24* | 25 pounds |
| CARBOWAX 400 | 0.5 pounds |
| Hydrated Lime | 5 pounds |

*Same blend as in Example I.

These ingredients were processed in the same manner as those in Example I except that the following temperatures were used on the extruder:

| Zone One | 180° F. |
|---|---|
| Zone Two | 190° F. |
| Zone Three | 200° F. |
| Zone Four | 210° F. |
| Gate | 300° F. |
| Die | 320° F. |

Several spikes were randomly selected and ground, and two subsamples were analyzed. Feedstock NITROFORM was also analyzed. The following results were obtained:

| Spike Sample No. | Wt. % CWSN | Wt. % HWSN | Activity Index |
|---|---|---|---|
| 1 | 28.9 | 22.8 | 32.1 |
| 2 | 30.7 | 22.9 | 33.0 |
| Average | 29.8 | 22.8 | 32.5 |

| Feedstock NITROFORM Sample No. | Wt. % CWSN | Wt. % HWSN | Activity Index |
|---|---|---|---|
| 1 | 25.8 | 19.6 | 26.4 |
| 2 | 25.5 | 20.4 | 27.4 |
| Average | 25.6 | 20.0 | 26.9 |

Based on the above data, the following conclusions can be drawn:

(1) The percent nitrogen which is cold water soluble was slightly increased during processing;

(2) The percent of nitrogen which is hot water soluble was slightly increased during processing;

(3) The activity index was slightly increased during processing.

Thus, the percentage of sustained release nitrogen, the activity index and the percentage of nitrogen which is cold water soluble were increased slightly. Therefore, the process of this example can be used to make fertilizer products without having a detrimental effect on the amount and form of the nitrogen of urea-formaldehye condensate available for plant growth.

EXAMPLE III

Present Invention

The procedure of Example II was followed except the amounts of ingredients used were as follows:

| NITROFORM | 30 pounds |
|---|---|
| GELVATOL | 30 pounds |
| CARBOWAX 400 | 0.75 pounds |
| TSP | 10 pounds |
| POTASSIUM NITRATE | 15 pounds |
| HYDRATED LIME | 5 pounds |
| FILLER | 15 pounds |

These ingredients were processed in the same manner as those in Example II. Several spikes were randomly selected and ground, and two subsamples were analyzed. Feedstock NITROFORM was also analyzed. The following results were obtained:

| Spike Sample No. | Wt. % CWSN | Wt. % HWSN | Activity Index |
|---|---|---|---|
| 1 | 38.7 | 14.5 | 23.7 |
| 2 | 37.9 | 13.4 | 21.6 |
| Average | 38.3 | 13.9 | 22.6 |

| Feedstock NITROFORM Sample No. | Wt. % CWSN | Wt. % HWSN | Activity Index |
|---|---|---|---|
| 1 | 25.8 | 19.6 | 26.4 |
| 2 | 25.5 | 20.4 | 27.4 |
| Average | 25.6 | 20.0 | 26.9 |

Based on the above data, the following conclusions can be drawn:

(1) The percent nitrogen which is cold water soluble was significantly increased during processing;

(2) The precent of nitrogen which is hot water soluble decreased during processing;

(3) The activity index was slightly decreased from that of the nitroform during processing;

Thus, both the percentage of sustained release nitrogen and the activity index were slightly decreased during processing. The percentage of nitrogen which is cold water soluble was increased significantly. Therefore, the process of this example can be used to make fertilizer products without having a detrimental effect on the amount of available nitrogen of urea-formaldehyde condensate.

EXAMPLE IV

Prior Art Composition and Process Utilizing Urea-Formaldehyde Condensate

The procedure of Example II was followed except the amounts of ingredients used were as follows:

| NITROFORM | 30 pounds |
|---|---|
| GELVATOL | 44.5 pounds |
| 0-24-24* | 25 pounds |
| CARBOWAX 400 | 0.5 pounds |

*Same blend as in Example II.

These ingredients were processed in the same manner as those in Example II. Feedstock NITROFORM was also analyzed. The following results were obtained:

| Spike Sample No. | Wt. % CWSN | Wt. % HWSN | Activity Index |
|---|---|---|---|
| 1 | 38.2 | 5.2 | 8.4 |
| 2 | 41.1 | 5.8 | 9.9 |
| Average | 39.6 | 5.5 | 9.1 |

| Feedstock NITROFORM Sample No. | Wt. % CWSN | Wt. % HWSN | Activity Index |
|---|---|---|---|
| 1 | 25.8 | 19.6 | 26.4 |
| 2 | 25.5 | 20.4 | 27.4 |
| Average | 25.6 | 20.0 | 26.9 |

Based on the above data, the following conclusions can be drawn:

(1) The percent of nitrogen which is cold water soluble was significantly increased during processing;
(2) The percent of nitrogen which is hot water soluble was drasticly reduced during processing;
(3) The activity index was significantly reduced during processing.

Thus, both the percentage of sustained release nitrogen and the activity index were significantly reduced during processing. The percentage of nitrogen which is cold water soluble was increased significantly. Therefore, the process of this example cannot be used to make fertilizer products without having a detrimental effect on the amount and form of the available nitrogen of urea-formaldehyde condensate.

Many changes and modifications will occur to those skilled in the art upon study of this disclosure. All such changes and modifications that fall within the scope of the present invention as defined in the appended claims are intended to be included within its scope.

We claim:

1. A process for producing a shaped controlled release fertilizer product which provides improved sustained release of nitrogen, said process comprising:
   (a) mixing a water soluble thermoplastic binder, urea-formaldehyde condensate having a urea to formaldehyde mole ratio in the range from about 1.25 to about 1.4, a plasticizer, and a pH modifier to produce a mixture; and
   (b) subjecting said mixture to such conditions including temperature and pressure so as to produce a shaped fertilizer product, the amount of said pH modifier in said mixture being sufficient to bring the pH in the shaped fertilizer product to the range from about 6 to about 12.

2. The process of claim 1 wherein said water soluble thermoplastic binder is poly(vinyl alcohol).

3. The process of claim 2 wherein said pH modifier is magnesium oxide.

4. The process of claim 2 wherein said pH modifier is hydrated lime.

5. The process of claim 2 wherein said water soluble thermoplastic binder is hydroxy propyl cellulose.

6. The process of claim 3 wherein said pH modifier is hydrated lime.

7. The process of claim 3 wherein said pH modifier is magnesium oxide.

8. The process of claim 1 wherein said binder is GELVATOL and the urea-formaldehyde condensate is NITROFORM.

9. The process of claim 8 wherein plant nutrients are included in the mixture.

10. The process of claim 8 wherein said pH modifier is hydrated lime.

11. The process of claim 8 wherein said pH modifier is magnesium oxide.

12. The process of claim 1 wherein an inert filler is added in step (a).

13. The process of claim 1 wherein plant nutrients are added in step (a).

14. The process of claim 1 wherein said pH modifier is hydrated lime.

15. The process of claim 1 wherein said pH modifier is magnesium oxide.

16. A process for producing a shaped controlled release fertilizer product which provides improved sustained release of nitrogen, said process comprising:
   (a) mixing a partly water soluble thermoplastic binder, a partly water soluble urea formaldehyde condensate, a plasticizer and a pH modifier to produce a mixture; and
   (b) subjecting said mixture to such conditions including temperature and pressure so as to produce a shaped fertilizer product, the amount of said pH modifier being sufficient so that the amount of slow release nitrogen is substantially the same as the amount of such nitrogen in the urea formaldehyde used to produce said mixture.

17. The process of claim 16 wherein the urea formaldehyde condensate has a urea to formaldehyde ratio in the range from about 1.25 to about 1.4 and wherein the amount of said pH modifier in said mixture is sufficient to bring the pH in the shaped fertilizer product to the range from about 6 to about 12.

18. The process of claim 17 wherein said pH modifier is hydrated lime.

19. The process of claim 17 wherein the amount of said pH modifier in said mixture is sufficient to bring the pH in the shaped fertilizer product to the range from about 6.5 to about 8.5.

20. The process of claim 19 wherein said pH modifier is hydrated lime.

21. The process of claim 16 wherein said pH modifier is hydrated lime.

22. A controlled release fertilizer product which provides a sustained release of nitrogen, said product comprising:
   a partly water soluble urea-formaldehyde condensate; and
   a water soluble thermoplastic binder a plasticizer and a pH modifier, said fertilizer product having the pH in the range from about 6 to about 12.

23. The fertilizer of claim 22 wherein the binder is poly(vinyl alcohol).

24. The fertilizer of claim 22 wherein the poly(vinyl alcohol) is GELVATOL, the urea formaldehyde is NITROFORM and said plasticizer is CARBOWAX 400.

25. A method for providing nutrients to a plant at a controlled rate, including providing sustained release of nitrogen, said method comprising:
   (a) mixing a water-soluble thermoplastic binder, urea-formaldehyde condensate having a urea to formaldehyde mole ratio in the range from about 1.25 to abuut 1.4, a plasticizer, and a pH modifier to produce a mixture;
   (b) subjecting said mixture to such conditions including temperature and pressure so as to produce a shaped fertilizer product, the amount of said pH modifier in said mixture being sufficient to bring the pH in the shaped fertilizer product to the range from about 6 to about 12; and
   (c) inserting into the soil in the vicinity of said plant's roots the shaped fertilizer product.

* * * * *

UNITED STATES PATENT AND TRADEMARK OFFICE
CERTIFICATE OF CORRECTION

PATENT NO. : 4,474,595
DATED : October 2, 1984
INVENTOR(S) : William T. Lawhon, Jr. and Henry M. Grotta It is certified that error appears in the above-identified patent and that said Letters Patent is hereby corrected as shown below:

In column 5, line 64, please delete "jacekt" and substitute therefor --jacket--;

In column 6, line 44, please delete "analyzed The" and substitute therefor --analyzed. The--;

In column 8, line 46, please delete "processing;" and substitute therefor --processing.--;

In column 9, line 24, please delete "processing;" and substitute therefor --processing.--;

In column 10, line 59, please delete "abuut" and substitute therefor --about--.

Signed and Sealed this

Second Day of September 1986

[SEAL]

Attest:

DONALD J. QUIGG

*Attesting Officer*   *Commissioner of Patents and Trademarks*